Aug. 22, 1967  N. D. REMY ETAL  3,337,170
TRAILER HITCH WITH YOKE RELEASE
Filed March 26, 1965
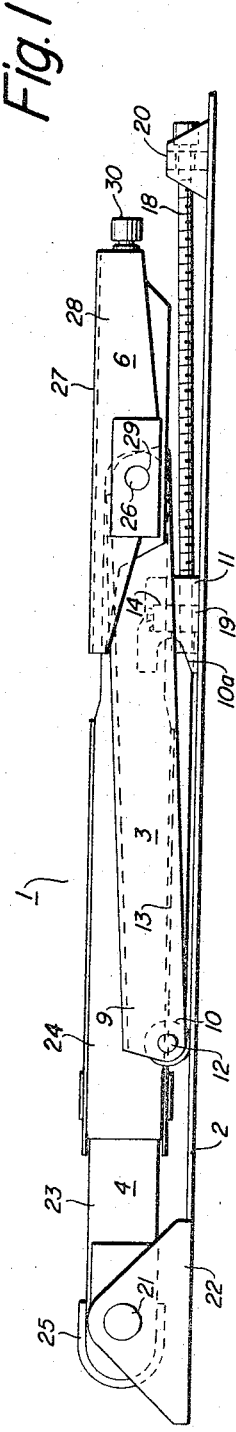
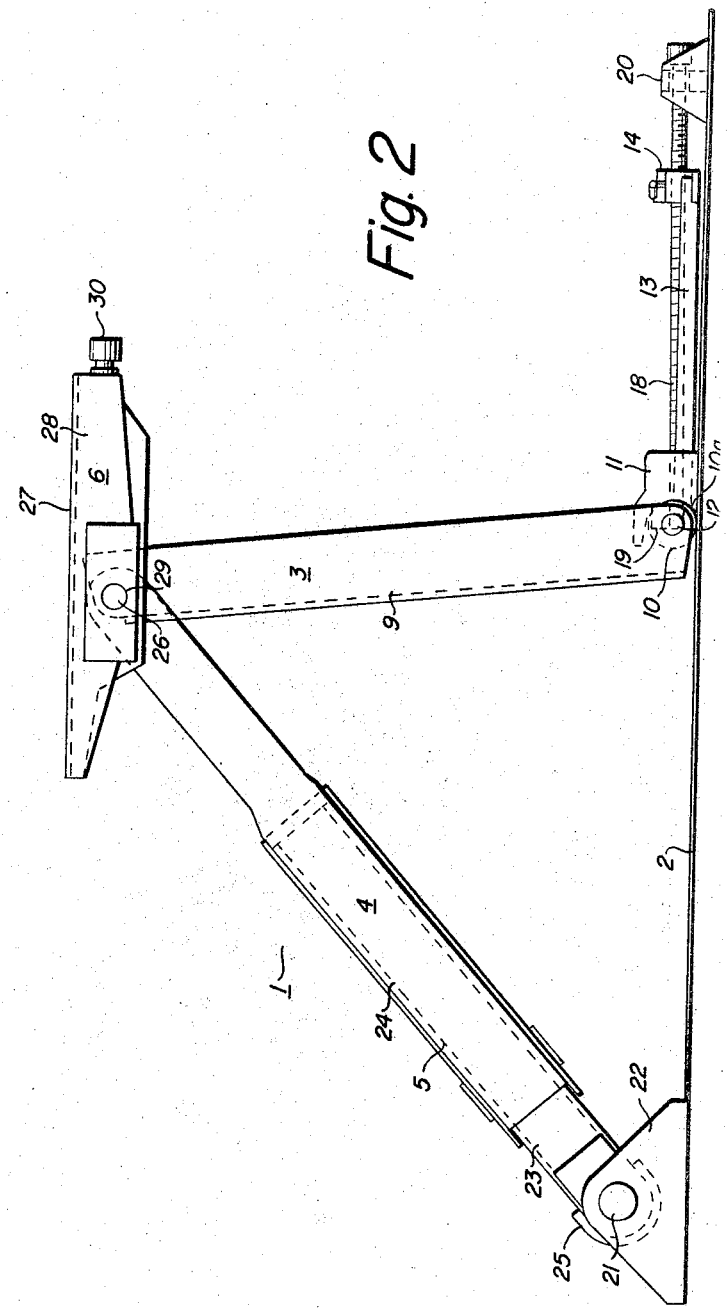
INVENTORS
Nicholas D. Remy
David P. Handwerk
David G. Strayer
William E. Kurtz

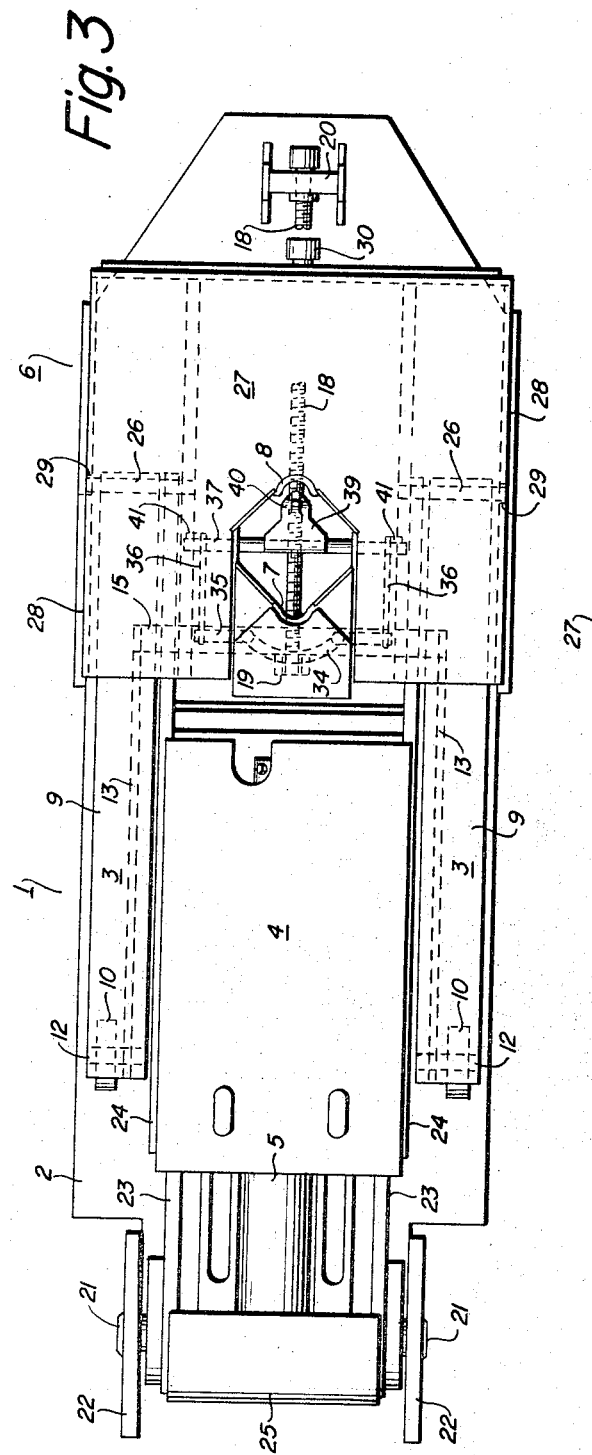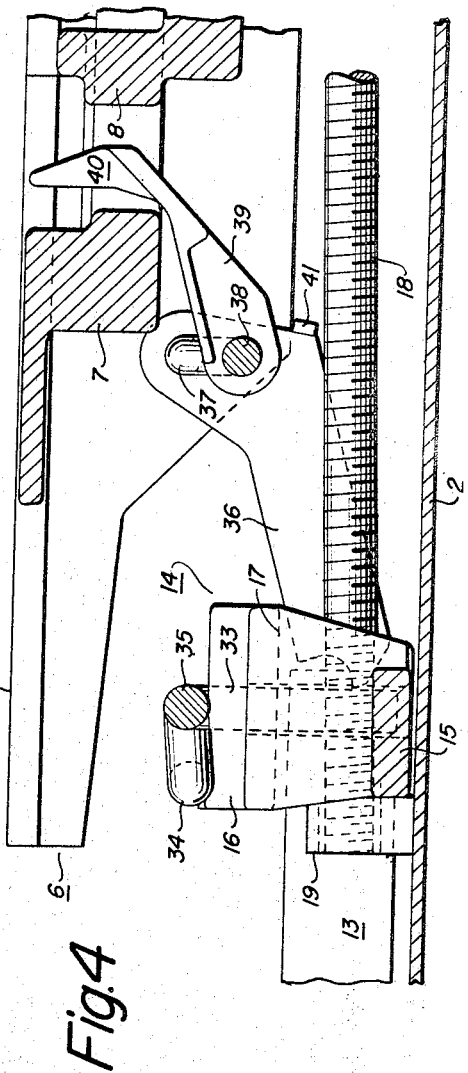

INVENTOR
Nicholas D. Remy
David P. Handwerk
David G. Strayer
William E. Kurtz

United States Patent Office 3,337,170
Patented Aug. 22, 1967

3,337,170
TRAILER HITCH WITH YOKE RELEASE
Nicholas D. Remy, Zionsville, David P. Handwerk, Allentown, and David G. Strayer and William E. Kurtz, Johnstown, Pa., assignors to Bethlehem Steel Corporation, a corporation of Delaware
Filed Mar. 26, 1965, Ser. No. 443,048
3 Claims. (Cl. 248—119)

This invention relates to a trailer hitch and anchor having cushioning means which will serve efficiently for either trailers or containers.

One object of this invention is to provide an effective hitch for supporting one end of a trailer on a flat car.

Another object is to provide means for disengaging lifting mechanism from the legs so as to adapt the hitch to a container instead of a trailer.

A further object is to provide suitable shock-absorbing means which will dependably restrain and cushion either a trailer or a container so as to prevent damage in transit.

Still other objects, purposes and advantages will be noted hereinafter in the specification and claims, and in the annexed drawings.

In the drawings:

FIG. 1 is a side elevation of the hitch in collapsed position;

FIG. 2 is a side elevational view of the erected hitch;

FIG. 3 is a top plan view of the hitch in collapsed position;

FIG. 4 is a partial vertical section of said collapsed hitch showing the disengaging mechanism prior to actuation;

Figure 5:
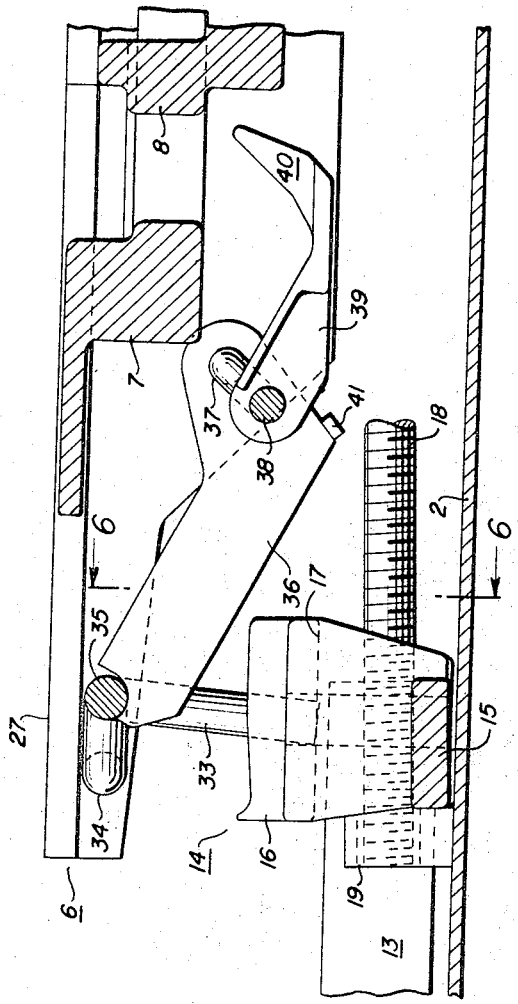
FIG. 5 is a view similar to FIG. 4, but after the yoke has been released from the lifting nut of the hitch.

Referring more particularly to FIG. 2 of the drawings, the trailer hitch 1, as elevated to support one end of a trailer (not shown), includes the elements of a fixed base plate 2, a normally substantially vertical first leg member 3, a normally diagonal second leg member 4, shock absorber or cushioning means 5 in said second leg member 4, and a fifth wheel platform or head member 6 pivotally mounted on the upper ends of said first and second leg members. Said head member 6 has separable jaws 7 and 8 for gripping a trailer, rack or container king-pin. The hitch additionally includes means (hereinafter described) for lifting the hitch, and means (also to be described) for disconnecting the collapsed hitch from the lifting mechanism.

The first leg member 3 is preferably composed of a pair of spaced parallel upright members 9. In their lowered position (FIGS. 1 and 3), said members 9 extend rearwardly substantially parallel to and exteriorly of the second leg member 4. The rear ends of said members 9 are mounted on rollers 10 on shafts 12 on which are pivoted the rear ends of the drag-bars 13 of a yoke 14 having a forward cross-member 15, with a central box-shaped holder 16 for a nut 17. By means of a horizontal drive-screw 18 extending through the nut 17 and journaled in bearings 19 and 20, the leg members 9 are advanced to vertical or slightly beyond vertical (FIG. 2), and the rollers 10 will then engage in the concave recesses 10a of the roller stops 11 on the base plate 2.

Said base plate 2 is welded or otherwise attached firmly to the deck (not shown) of a railway flat car. Pivotally mounted by pins 21 in the rear fulcrum or pivot brackets 22 on the base plate 2 is the lower shock arm 23 of the diagonal second leg member 4. Said leg member 4 in its lowered position extends forward substantially parallel to the base plate 2. In telescoping relation to said lower shock arm 23 is a cooperating upper shock arm 24. A curved end plate 25 protects the lower shock arm 23, and supports a double-acting shock-absorber 5 (preferably of the fluid-pressure cylinder type) or other suitable cushioning means, interposed between the upper and lower shock arms. See FIG. 3.

The forward end of said upper shock arm 24 is pivotally connected by pin member 26 to the upper end of the first leg member 3.

The king-pin gripping platform or head 6 basically comprises a flat-topped member 27 having depending lower side portions 28 with holes 29 for the pin members 26. The separable jaws 7 and 8 are centrally carried by said head 6, and may be opened or closed by a drive-screw 30 having a suitable connection (not shown) with jaw 7.

The shock-absorbing device 5 of this hitch when in folded position may be utilized to cushion longitudinally movable racks or cradles for supporting large containers (not shown). This arrangement saves the considerable expense of providing separate cushioning means for the racks. For economy of space on the car deck, such a rack is preferably positioned to straddle a pair of such hitches, but the rack may utilize the cushioning of only one hitch or both, as may be preferred.

When the normally diagonal leg member 4 has been lowered, this leg member and the shock absorber therein will be substantially horizontal. When the rack is connected to the head 6 of the hitch, the buffing forces will pass through the leg member 4 including shock absorber 5. To enable the shock absorber 5 to cushion these forces, it is necessary for the hitch to be disconnected from the drive screw 18.

Figure 6:
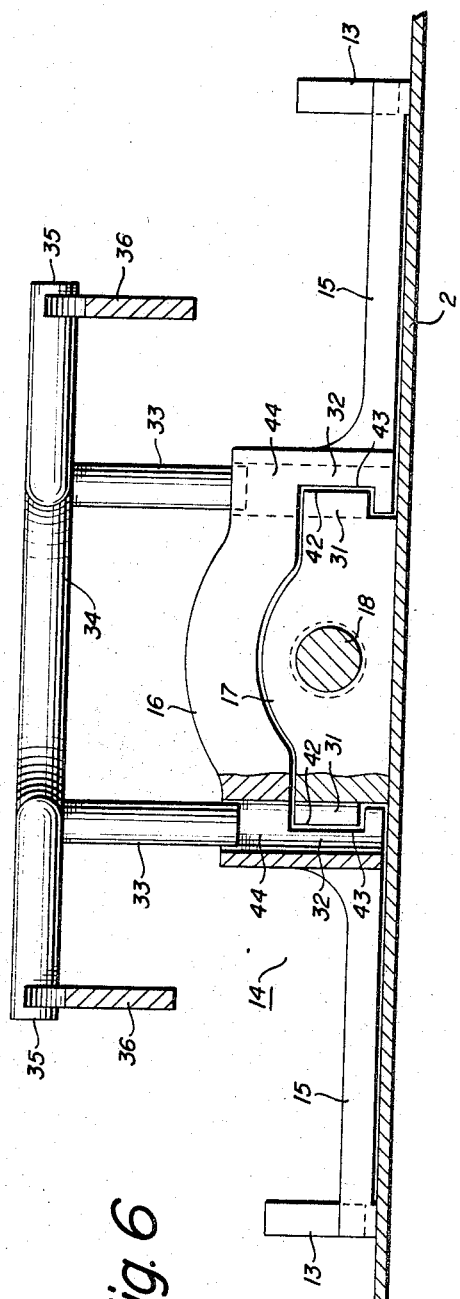
FIG. 6 is a partial section on the line 6—6 of FIG. 5.

This disconnecting action is afforded by the yoke release assembly best shown in FIGS. 4, 5 and 6. Said yoke release assembly is a sturdy and simple pivoted device which disconnects the box-shaped holder 16 in the cross-member 15 of the vertical leg's elevating yoke 14 from the nut 17 of drive screw 18 whenever a king-pin or similar member (not shown) is inserted downwardly between the king-pin receiving jaws 7 and 8 of the head member 6 when the hitch is in the collapsed position.

Said nut 17 has side flanges 42 which are horizontally slidable in corresponding recesses 43 in the holder 16 when holder 16 is disconnected from nut 17. Said holder 16 has a pair of transversely aligned veirtcal holes 44 on opposite sides of drive screw 18. The holes 44 extend through said flanges 42 and recesses 43, and will thereby provide on their mating surfaces counterpart semi-circular vertical recesses 31 and 32 which normally function as sockets to contain the depending bifurcated or "hairpin" ends 33 of a rearwardly bowed transverse locking rod member 34. When said counterpart recesses are transversely aligned and the rod ends 33 are in fully down position therebetween, the nut 17 is securely attached to the holder 16 and enables the drive-screw 18 to lift and lower the hitch.

Said rod member 34 is provided with outwardly projecting side fingers 35 adapted to be raised by lifting links or hooks 36 (FIGS. 4, 5 and 6) when the hitch is in the collapsed position. Links 36 are secured to a second transverse rod 37 which is rotatably mounted on the underside of the head 6. See FIG. 3.

The rod 37 has a downwardly bowed central portion 38 on which is securely mounted an upwardly inclined claw member 39 having a raised finger portion 40 extending upwardly between the jaws 7 and 8. When the hitch is collapsed, the insertion of a rack king-pin or similar member between the jaws 7 and 8 will cause finger portion 40 to move from its position shown in FIG. 4 to the position shown in FIG. 5. Since finger portion 40 is secured to rod 37, the movement of finger portion 40 causes rod 37 to rotate and move links 36 from the position shown in FIG. 4 to the position shown in FIG. 5. During this movement, links 36 contact side fingers 35 and raise "hairpin" ends 33 out of the recesses 31 and 32, as shown in FIGS. 5 and 6. This disengages the drive screw 18 and nut 17 from the holder 16 of elevating yoke 14. In this condition, the shock absorber 5 of leg 4 will cushion the forces which tend to act between the rack and car deck (not shown).

When said "hairpin" ends 33 have been replaced in locking engagement between the nut and holder, the hitch may then be elevated again to support a trailer thereon. During the raising of the hitch from the collapsed position, the relative movement between the head 6 and cross member 15 is such that links 36 do not engage side fingers 35. Due to gravity, links 36 and rod 37 tend to rotate in a counterclockwise direction as viewed in FIG. 4. Stops 41 attached to links 36 limit this rotation by contacting the underside of the head 6.

Although we have shown and described our invention in considerable detail hereinabove, we do not wish to be limited to the exact and specific construction so shown and described, but we may also use such substitutions, modifications or equivalents thereof as are embraced within the scope and spirit of the invention, or pointed out in the appended claims.

We claim:
1. A collapsible trailer hitch having a base, a first leg disposed uprightly when in a raised position, a second leg inclined at an angle relative to said first leg when in a raised position and substantially parallel to the base while in a lowered position when the hitch is collapsed, cushioning means in said second leg, said legs being pivotally connected adjacent their upper portions, a head member including separable jaws pivotally supported by said legs, the lower end of said second leg pivotally fixed to said base, and means connected to said first leg to longitudinally move said first leg along said base for raising and lowering the upper portion of said legs to raise and lower said head member between a lowered position for supporting a container and a raised position for supporting a trailer, wherein the improvement comprises:
   (a) means for connecting the means for longitudinally moving the first leg to said leg; and
   (b) additional means operative upon actuation by a container on the head member to disconnect the means for longitudinally moving the first leg from said leg when the collapse of the hitch has placed said head member in the lowered position.

2. A collapsible trailer hitch having a base, a first leg disposed uprightly when in a raised position, a second leg inclined at an angle relative to said first leg when in a raised position and substantially parallel to the base when in lowered position, cushioning means in said second leg, said legs being pivotally connected adjacent their upper portions, a head member including separable jaws pivotally supported by said legs, the lower end of said second leg pivotally fixed to said base, and means connected to said first leg to longitudinally move said leg along said base for raising and lowering the upper portion of said legs to raise and lower said head member between a fully lowered position adapted for supporting a container while the hitch is collapsed and a fully raised position for supporting a trailer including a drive screw rotatably attached to said base and a nut in threaded engagement with said drive screw and connected to linkage pivotally attached to said first leg, wherein the improvement comprises:
   (a) means connecting the linkage to the nut;
   (b) means for disengaging said linkage from said nut; and
   (c) said latter means being so constructed and arranged as to be actuated by a container when said container is placed on the head member after said head member has been disposed in lowered position by the collapse of the hitch, and thereby rendering the cushioning means free to protect the container against horizontal buffing forces.

3. In a trailer hitch having a base, a first leg disposed uprightly when in a raised position, a second leg inclined at an angle relative to said first leg when in a raised position, cushioning means in said second leg, said legs being pivotally connected adjacent their upper portions, a head member including separable jaws pivotally supported by said legs, the lower end of said second leg pivotally fixed to said base, the improvement comprising:
   (a) means connected to said first leg to longitudinally move said first leg along said base for raising and lowering the upper portion of said legs to raise and lower said head member between a lowered position for supporting a container and a raised position for supporting a trailer, including a drive screw rotatably attached to said base and a nut in threaded engagement with said drive screw and connected to linkage pivotally attached to said first leg; and
   (b) means for disconnecting said linkage from said nut when said head member is in the lowered position, said latter means including
      (1) a pivot rod mounted beneath said head member,
      (2) a depressible finger attached to said pivot rod and extending upwardly between said jaws when said head member is in the lowered position, and
      (3) a lifting link attached to said pivot rod and adapted to release a locking member between said nut and said linkage when said finger is depressed.

References Cited
UNITED STATES PATENTS

| | | | |
|---|---|---|---|
| 3,142,466 | 7/1964 | Gutridge et al. | 248—119 |
| 3,143,083 | 8/1964 | Gutridge et al. | 248—119 X |
| 3,145,006 | 8/1964 | Robinson et al. | 248—119 |
| 3,188,982 | 6/1965 | Bergen et al. | 248—119 X |

ROY D. FRAZIER, *Primary Examiner.*

CLAUDE A. LE ROY, *Examiner.*

R. P. SEITTER, *Assistant Examiner.*